United States Patent

Kawakami et al.

[11] Patent Number: 5,933,783
[45] Date of Patent: Aug. 3, 1999

[54] PORTABLE TERMINAL

[75] Inventors: Masamichi Kawakami; Jun Kitakado, both of Gifu, Japan

[73] Assignee: Sanyo Electric Co., Ltd., Moriguchi, Japan

[21] Appl. No.: 08/703,784

[22] Filed: Aug. 27, 1996

[30] Foreign Application Priority Data

Aug. 29, 1995 [JP] Japan ................................ 7-245552

[51] Int. Cl.⁶ ............................. H24Q 7/32; H04M 1/00
[52] U.S. Cl. ............................ 455/550; 455/575; 455/90
[58] Field of Search .................................. 379/428, 433, 379/434, 440, 447; 455/550, 575, 566, 90, 418, 574, 556, 552, 553

[56] References Cited

U.S. PATENT DOCUMENTS

| | | | |
|---|---|---|---|
| 4,845,772 | 7/1989 | Metroka et al. | 455/574 |
| 5,564,078 | 10/1996 | Nagai | 455/90 |
| 5,584,054 | 12/1996 | Tyneski et al. | 455/575 |
| 5,590,417 | 12/1996 | Rydbeck | 455/568 |
| 5,615,259 | 3/1997 | Gilbert | 379/433 |
| 5,634,080 | 5/1997 | Kikinis et al. | 455/575 |
| 5,638,441 | 6/1997 | Hattori et al. | 379/433 |
| 5,646,649 | 7/1997 | Iwata et al. | 455/575 |
| 5,657,370 | 8/1997 | Tsugane et al. | 379/433 |
| 5,659,890 | 8/1997 | Hidaka | 455/556 |
| 5,710,576 | 1/1998 | Nishiyama et al. | 379/428 |
| 5,719,936 | 2/1998 | Hillenmayer | 455/575 |

FOREIGN PATENT DOCUMENTS 4-273639   9/1992   Japan .

OTHER PUBLICATIONS

Simon, Cellular Phone, Handwriting and keyboard functions, Address Book, E–Mail, Fax, Pager, Jan. 1994.

*Primary Examiner*—Dwayne D. Bost
*Assistant Examiner*—Jean A. Gelin
*Attorney, Agent, or Firm*—Armstrong, Westerman, Hattori, McLeland & Naughton

[57] ABSTRACT

A portable terminal has a portable terminal main body and an enclosure. If the enclosure is open, and if the portable terminal is in a communicating state after a power switch has been turned on, a memo mode is selected which makes it possible to take memos by input from a display panel using a pen. As a result, a memo-mode display image appears on the display, whereby it becomes possible to take memos during communication. In a portable terminal having a window formed in an enclosure, a normal-mode image is displayed as a result of the power switch being turned on even when the enclosure is closed. If the closure is open, and if the portable terminal is in a communicating state, the memo mode is selected.

22 Claims, 7 Drawing Sheets

PORTABLE TERMINAL

BACKGROUND OF THE INVENTION

1. Field of the Invention

The present invention relates to a portable terminal and, more particularly, to a PHS-capable portable telephone.

2. Description of the Related Art

Previously, various types of portable communications equipment, including a portable telephone, have been developed. For example, practical utilization of a second-generation cordless telephone system (or a personal handy phone system: PHS) is proceeding as a portable telephone system which enables one portable telephone unit to make a call in any conceivable situation, e.g., from home, an office, and outdoors.

As shown in Unexamined Japanese Patent Application No. Hei-4(1992)-273639, a traditional conventional portable telephone is evenly collapsible. This type of portable telephone has a window so that a user can see a liquid crystal display, or the like, through that window while the telephone is in a collapsed state.

Further, some traditional portable telephones have an open/close enclosure attached to a portable telephone main unit.

In the previously-described traditional portable telephone, it is necessary to have a notepad and an implement for taking memos, such as a writing implement, available if it becomes necessary to take memos regarding the conversation during communication. Unless they are available, it becomes impossible to take memos. Particularly, the portable telephone is very frequently used on the road. Even if the user has a notepad and a writing implement, it is very difficult to take memos during the telephone call.

In the portable telephone having an open/close enclosure, it is necessary to open the enclosure in order to press dials when, e.g., making a call.

SUMMARY OF THE INVENTION

The primary object of the present invention is to provide a portable terminal which allows a user to make a call with an enclosure closed as well as to easily take memos during telephone conversation.

According to a first aspect of the present invention, the invention provides a portable terminal having a radio communication function, the portable terminal being characterized by comprising:

a display panel having an image display section and a digitizer disposed on the image display section;

a portable terminal main body equipped with the display panel;

an enclosure attached to the portable terminal main body so as to be able to open and close;

enclosure open/closed state detecting means for detecting an open state of the enclosure; and communicating state detecting means for detecting a communicating state of the portable terminal, wherein if the enclosure open/closed state detecting means detects the open state of the enclosure, and if the communication detecting means detects a communicating state of the portable terminal, a memo mode is selected which makes it possible to take memos by input from the display.

In the above described portable terminal, when the enclosure is open, and when the portable terminal is in a communicating state, the memo mode is selected. As a result of opening of the enclosure during telephone conversation or origination of a call while the enclosure is open, the operation mode changes to the memo mode, which makes it possible to take memos by input on the display panel.

According to a second aspect of the present invention, there is provided a portable terminal having a radio communication function, the portable terminal being characterized by comprising:

a display panel having an image display section and a digitizer disposed on the image display section;

a portable terminal main body equipped with the display panel;

an enclosure attached to the portable terminal main body so as to be able to open and close;

enclosure open/closed state detecting means for detecting an open state of the enclosure;

communicating state detecting means for detecting a communicating state of the portable terminal; and receiving-end detecting means for detecting that the portable terminal is a receiver when in a communicating state, wherein if the enclosure open/closed state detecting means detects the open state of the enclosure, if the communicating state detecting means detects a communicating state of the portable terminal, and if the receiving-end detecting means detects that the potable terminal is a receiver, a memo mode is selected which makes it possible to take memos by input from the display.

In the above described portable terminal, when the enclosure is open, when the portable terminal is in a communicating state, and when the portable terminal is a receiver, the memo mode is selected. Therefore, while the portable terminal is in a receiving state, it is possible to take memos. Further, the operation mode is not switched to the memo mode if the portable terminal is a caller, and therefore it is possible to press keys even if the portable terminal changes to the communicating state.

According to a third aspect of the present invention, there is provided a portable terminal having a radio communication function, the portable terminal being characterized by comprising:

a display panel having an image display section and a digitizer disposed on the image display section;

a portable terminal main body equipped with the display panel; and an enclosure which has a window and is attached to the portable terminal main body so as to be able to open and close, wherein when the power of the portable terminal is turned on, it is possible to carry out origination and receipt of calls even when the enclosure is closed by indicating on the display panel an image for a normal mode, in which at least the origination and receipt of telephone calls can be carried out, and by indicating display keys for, at least, carrying out the origination and receipt of calls within an opening of the enclosure.

In this portable terminal, the enclosure is provided with a window so as to enable observation of some of the display panel while the enclosure is closed. Hence, at least some of the normal mode display keys are displayed within the window. In short, when the power of the portable terminal is turned on, the display keys necessary to originate and receive calls are displayed within the window of the enclosure. As a result, it is possible to normally originate and receive calls even if the enclosure is closed as well as to protect the portion of the display panel covered with the enclosure.

DESCRIPTION OF THE PREFERRED EMBODIMENTS

With reference to the accompanying drawings, preferred embodiments of the present invention will be described in detail hereinbelow.

Figure 1:
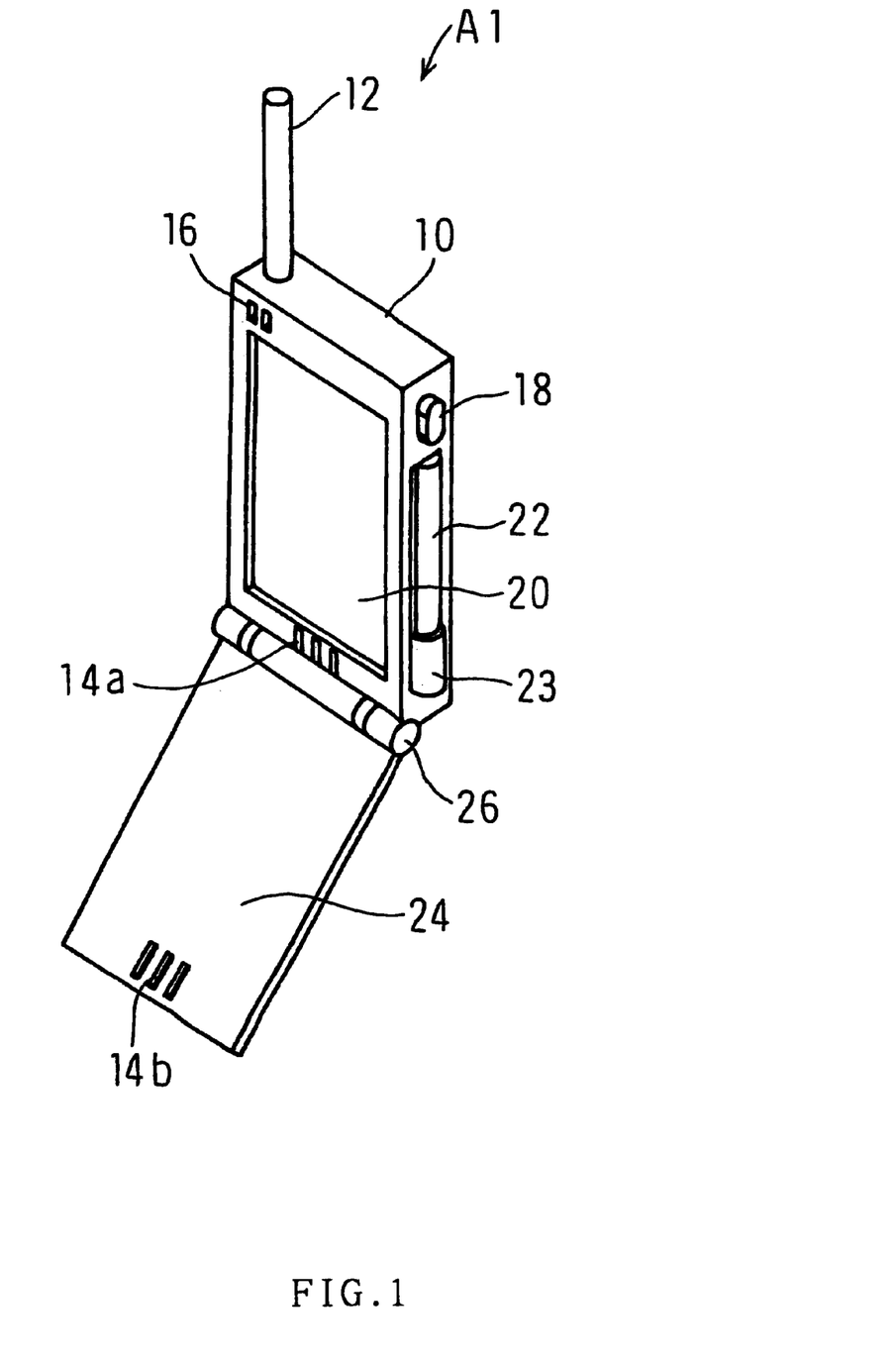
FIG. 1 is a perspective view of a portable terminal according to a first embodiment of the present invention when an enclosure of the portable terminal is open.
Figure 2:
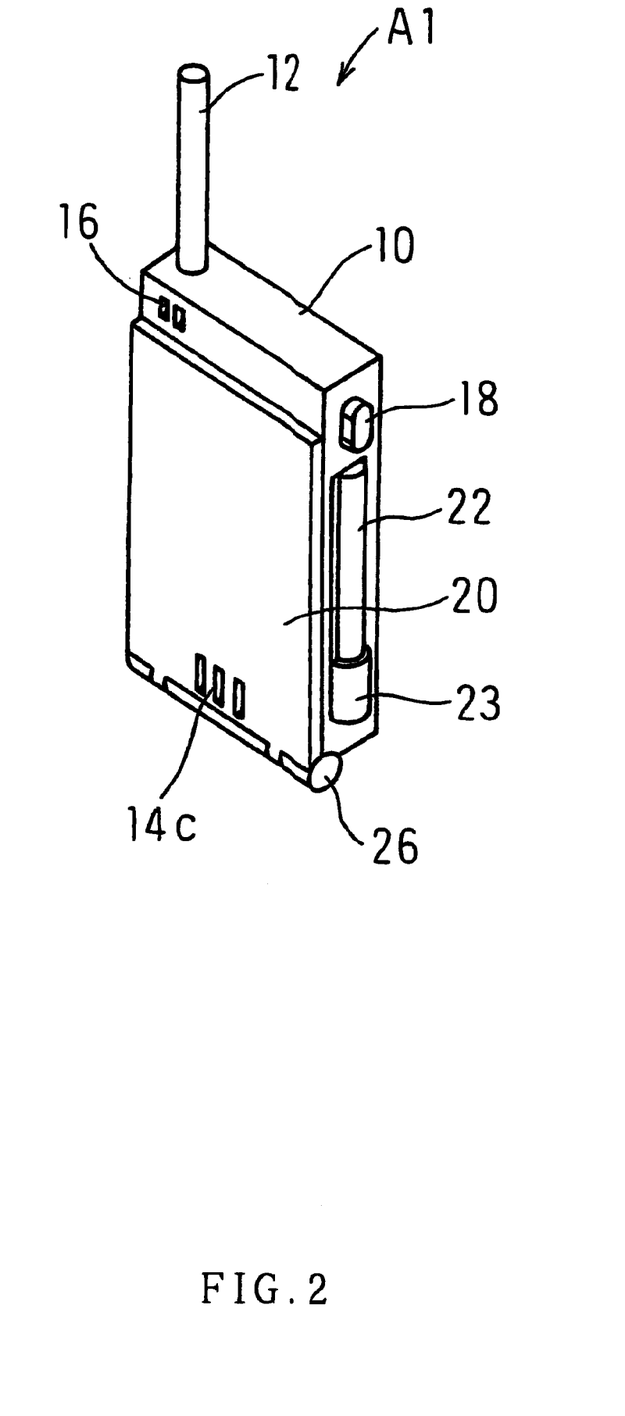
FIG. 2 is a perspective view of the portable terminal according to the first embodiment of the present invention when the enclosure is closed.

A portable terminal A1 according to a first embodiment of the present invention has a configuration such as shown in FIGS. 1 and 2. The portable terminal A1 comprises a substantially rectangular-parallelepiped portable terminal main body 10, and an enclosure 24 hinged to the portable terminal main body 10 via a hinge 26 so as to become movable through a predetermined angle.

The portable terminal main body 10 comprises an antenna 12, a telephone transmitter 14a, a telephone receiver 16, a power actuating switch 18, a display panel 20, and a pen holder 23. The antenna 12 is disposed on the upper end of the portable terminal main body 10 in order to receive radio waves. The telephone transmitter 14a is provided in a lower part of the front of the portable terminal main body 10 in order to receive voice input. The telephone receiver 16 is provided in an upper part of the front of the portable terminal main body 10 in order to produce voice output. The power actuation switch 18 is provided in the side surface of the portable terminal main body 10 for use in turning the power of the portable terminal A1 on an off. This power actuation switch 18 can be formed into various shapes such as a button switch and a slide switch. The display panel 20 is an LCD with a touch panel. This LCD with a touch panel is made up of a pressure-sensitive touch panel and an LCD. The touch panel is affixed onto the LCD. Various indications such as a dial key and a message are displayed on the display panel 20, and it also becomes possible to input dial keys and set various instructions from this display panel 20. The pen holder 23 comprises an insertion portion into which the tip end of a pen 22 is inserted, and an indentation formed in the side surface of the portable terminal main body 10. The pen holder 23 is designed so as to enable removal of the pen 22. In short, the pen 22 can be held as a result of it being inserted into the insertion portion and the indentation.

The enclosure 24 has a size and shape so as to cover the entire display panel 20, and a telephone transmitter 14b is formed in the interior surface along the upper edge of the enclosure 24. Further, a telephone transmitter 14c is further provided in the exterior surface of the enclosure 24, as shown in FIG. 2. All of these telephone transmitters 14a, 14b, and 14c enable voice input. In short, it is possible to carry out telephone conversation while the enclosure 24 is closed. The enclosure 24 may be formed so as not to cover the entire display panel 20 but to cover only a portion of it. For example, the length of the enclosure 24 may be made slightly shorter than that of the enclosure shown in FIG. 1 so as to enable visual check of the upper part of the display panel 20 while the enclosure is closed.

The configuration of the portable terminal A1 will now be described with reference to the block diagram shown in FIG. 5. The portable terminal A1 comprises an antenna 32, a telephone transmitter 34, a telephone receiver 36, a communication processing section 38, a storage section 40, a display section 42, an input section 44, an enclosure open/closed state detecting section 46, an operation detection section 48, and a main control section 50.

The antenna 32 sends and receives radio waves and corresponds to the antenna 12 shown in FIG. 1. The telephone transmitter 34 receives voice input and corresponds to the telephone transmitters 14a, 14b, and 14c shown in FIG. 1. The telephone receiver 36 produces voice output and corresponds to the telephone receiver 16 shown in FIG. 1. The communication processing section 38 carries out radio communication with respect to a base station, a main unit, and other terminals. For example, the communication processing section 38 modulates data such as communication data and character data according to a modulation mode which conforms to the PHS communications system and, conversely, demodulates the data modulated according to that modulation mode. Further, the communication processing section 38 acts as communicating state detecting means and receiving-end detecting means.

The storage section 40 holds a variety of information necessary to activate the portable terminal A1. Particularly, the portable terminal A1 of the present embodiment has, at least, a normal mode and a memo mode as operation modes. The storage section 40 holds display image data for these modes.

In the normal mode, an image analogous to dial keys of a traditional telephone and a variety of function keys is displayed. Touching icons in the display image enables input of corresponding dial numbers and information relevant to the functions. In short, the normal-mode image comprises function keys for setting a receiving level, time, dial numbers to which a call is originated, and dial numbers of callers from which a call is received and for executing one-touch dialing and call-hold functions; dial keys arrayed in a matrix pattern for inputting dial numbers; and various messages.

The memo-mode display image comprises various icons arranged along the edges of the display image and a remaining space used only for taking memos. The icons comprise an icon for specifying an input function, an icon for specifying a line thickness, an icon for specifying an erasing function, an icon for specifying the recording of memo data into a file formed in the storage section 40, an icon for specifying the reading of data from the file, or the like.

Another icon may be provided for forcibly switching from one mode to the other mode in both the normal-mode image and the memo-mode display image.

The display section 42 executes the displaying of various indications such as dial keys and messages. More specifically, the display section 42 corresponds to the LCD of the previously described touch-panel LCD. The input section 44 executes input of the dial keys and setting of various instructions. Specifically, the input section 44 corresponds to the touch panel of the touch-panel LCD. The enclosure open/closed state detecting section 46 detects whether the enclosure 24 is open or closed. The operation detecting section 48 detects whether the power switch is turned on or off. The enclosure open/closed state detecting section 46 acts as the enclosure open/closed state detecting means.

The main control section 50 controls the operation of each of the above-described sections. For example, if the operation mode is set to the normal mode, control is executed so as to carry out normal telephone functions. For instance, in the case of origination of a call, when the origination of a call with respect to a predetermined telephone number is instructed by the input section 44, the main control section 50 originates a call by controlling the communication processing section 38. Further, if a call is received, the main control section 50 controls the communication processing section 38, so that the portable terminal becomes communicable. If the operation mode is set to the memo mode, the main control section 50 carries out a control operation so as to enable input of a memo. As a result, hand-written input letters are directly displayed on the display section 42, and the main control section 50 recognizes the hand-written input letters and displays corresponding typescripts on the display section 42. The main control section 50 stores the contents of the memo in the storage section 40. The main control section 50 outputs the contents stored in the storage section 40 to the display section 42 in accordance with an instruction input from the input section 44.

Further, the main control section 50 controls the switching of the operation mode between the normal mode and the memo mode in accordance with the result of the detection of the enclosure open/closed state detecting section 46, or the like.

Figure 6:
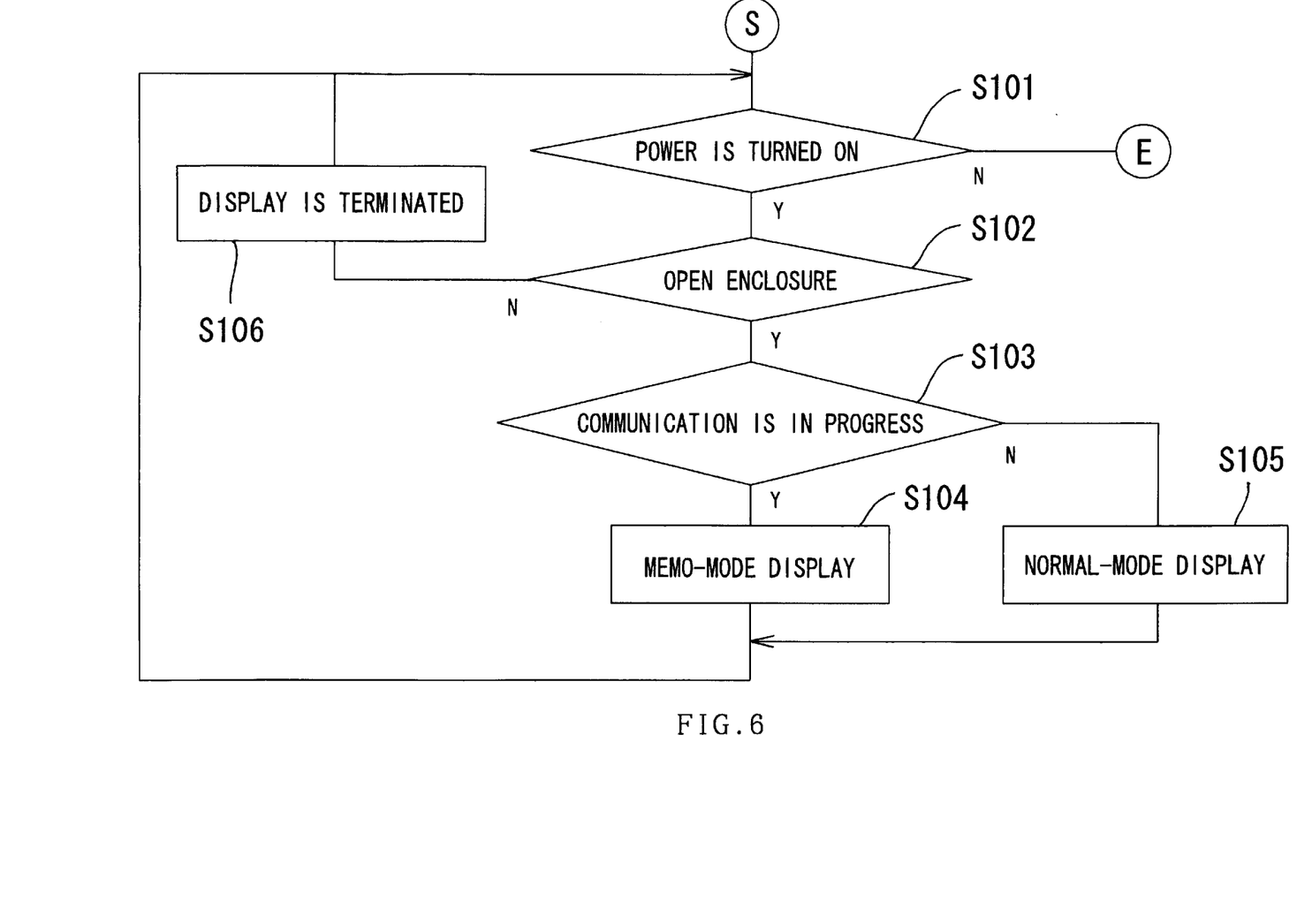
FIG. 6 is a block diagram showing the operation of the portable terminal of the first embodiment.

With reference to FIG. 6, the operation of the portable terminal A1 having the above-described configuration will be described.

To begin with, the operation detecting section 48 detects whether or not the power switch 18 is in an ON state, and a result of the detection is sent to the main control section 50 (step S101). If the power switch 18 is in an ON state, the processing proceeds to step S102. On the other hand, if the power switch 18 is in an OFF state, the processing is immediately terminated. The detection carried out in step S101 is executed at predetermined periods.

If the power switch 18 is in an ON state, the enclosure open/closed state detecting section 46 detects, in step S102, whether the enclosure 24 is open or closed. A result of the detection is sent to the main control section 50. In this case, if the result of the detection is that the enclosure 24 is open, the processing proceeds to step 103. On the other hand, if the enclosure 24 is in a closed state, the processing proceeds to step S106, and the indication of the display is terminated. If the enclosure 24 is in a closed state when the power of the portable terminal is initially turned on, no display is indicated. Therefore, that no-display condition continues.

If the enclosure is open, the communication processing section 38 detects the portable terminal is in the course of commuication in step S103. A result of the detection is sent to the main control section 50. If the result of the detection is that the portable terminal is in the course of communication, the processing proceeds to step S104. On the other hand, if the portable terminal is not in the act of commuication, the processing proceeds to step S105.

The main control section 50 switches the operation mode to the memo mode in step S104, and the memo-mode display image appears on the display section 21. As a result, it becomes possible to take memos. In short, if a predetermined coordinate on the touch panel that acts as the input section 44 is pressed, the input section 44 detects the position of the pressed point. The thus detected position is communicated to the main control section 50. The main control section 50 carries out processing associated with the position of the pressed point and instructs the display section 42 to indicate a predetermined display. For example, in the case where the input function is specified by a predetermined icon, a line or a letter is input as a result of the touch panel being pressed by the pen 22, whereby a display is indicated on the display section 42 in accordance with the information of the pressed position. The main control section 50 also has the function of recognizing hand-written letters and, is therefore capable of displaying corresponding typescripts by recognizing predetermined hand-written letters. The contents of the resultant memo can be stored in the storage section 40 by predetermined operations. If the portable terminal A1 has a facsimile function, it is possible to send the contents of the memo by facsimile.

As described above, in the case where the enclosure 24 is open, and where the portable terminal is in communication, the operation mode is switched to the memo mode. As a result, it becomes possible to take memos during telephone conversation. In other words, in order to carry out transmission, the enclosure is opened, and a call is originated. When the portable terminal comes in communication with a called party, the operation mode is switched to the memo mode at the moment when the portable terminal changes to a communicating state, because the enclosure is opened, and the portable terminal is in a communicating state. As a result, it becomes possible to take memos. On the other hand, when the portable terminal receives a call, a ringing tone sounds. The moment when a hookup operation is carried out, the portable terminal changes to the communicating state. However, even if the enclosure 24 remains closed, it is still possible to start communication. Therefore, the operation mode is not switched to the memo mode as a result of execution of a simple hookup operation. Switching of the operation mode to the memo mode does not take place when only the hookup operation is carried out but when the enclosure 24 is also opened. If the hookup operation is carried out after the enclosure 24 has been opened, the operation mode is switched to the memo mode the moment when the portable terminal changes to the communicating state. Further, the operation mode is automatically switched to the memo mode, and there is no need to switch the operation mode to the memo mode each time.

The open state of the enclosure 24 is included in the requirements for switching the operation mode to the memo mode. It is pointless to switch the operation mode to the memo mode while the enclosure is closed, and therefore it can be said that it is necessary to include the open state of the enclosure in the requirements for switching the operation mode to the memo mode.

In fact, it is impossible to make memos on the display panel 20 while the telephone receiver 16 is brought in contact with an ear. Therefore, it is possible that an earphone (not shown) can be used, or that the telephone receiver 16 is provided with so-called speaker function which makes it possible to listen to the voice of the called party without bringing the ear in contact with the telephone receiver 16 by amplifying the voice.

Further, the portable terminal may be provided with the function of forcibly returning the operation mode switched to the memo mode in step S104 to the normal mode. In short, key operations may be further required after the portable terminal has changed to the communicating state as a result of the opening of the enclosure 24. In such a case, an icon for forcibly changing the current mode to the normal mode may be provided so as to make it possible for the input section 44 to change the current mode to the normal mode. In other words, that icon provided in the input section 44 acts as the previously described switching means.

Allowing for the previously described need of key operations after the call has been originated, it is also possible to switch the operation mode to the memo mode only when the portable terminal A1 is end receiving. In other words, whether or not the portable terminal is end receiving is determined between steps S103 and S104, and the operation mode is switched to the memo mode only when the portable terminal is end receiving. If the portable terminal is not receiving, the processing proceeds to step S105, and the normal-mode image is displayed. In this event, the communication processing section 38 determines whether or not the portable terminal is receiving. In short, the communication processing section 38 acts as the receiving-end detecting means.

On the other hand, the main control section 50 switches the operation mode to the normal mode in step S105 and displays the normal-mode image on the display section 21. As a result, it becomes possible to carry out telephone functions, e.g., origination and receipt of a telephone call, or the like. Specifically, if a predetermined coordinate on the touch panel that acts as the input section 44 is pressed, the input section 44 detects this pressing action. Then, the position of the pressed point is notified to the main control section 50. The main control section 50 executes processing associated with the position of the pressed point and instructs the display section 42 to indicate a predetermined display. For example, if dial key displays are pressed, an input dial number is displayed in a dial number display position within the display image. Subsequently, if a transmission key is pressed, a call is originated by way of the communication processing section 38. On the other hand, if a call is received, it also becomes possible to start communication by pressing a predetermined hookup key. It is possible for a user to use the easiest-to-use one of the telephone transmitters 14a, 14b, and 14c provided in the portable terminal A1 in the communication. Particularly, it is possible to choose the easiest-to-use telephone transmitter because the telephone transmitters 14a and 14c and the telephone transmitter 14b are different from each other in distance from the telephone receiver 16.

As previously described, the operation mode is switched to the normal mode if the enclosure 24 is open and if the portable terminal is not in the communicating state. If the power is turned on, and if the enclosure 24 is simply open, it is possible to carry out the telephone function. If the portable transmitter changes to the communicating state as a result of a call being originated while the enclosure is open, the operation mode will be switched to the memo mode in the same manner as previously described.

As described above, the normal-mode or memo-mode display image appears on the display panel 20 when the enclosure 24 is open. If the enclosure 24 is closed, no display image appears on the display panel 20, as designated by steps S106. In other words, the main control section 50 interrupts the indication of a display on the display panel 30 if the enclosure 24 is closed. As a result, it is possible to prevent wasteful consumption of a battery. Further, when the enclosure 24 is closed, the display panel 20 is covered, and hence protected.

Figure 3:
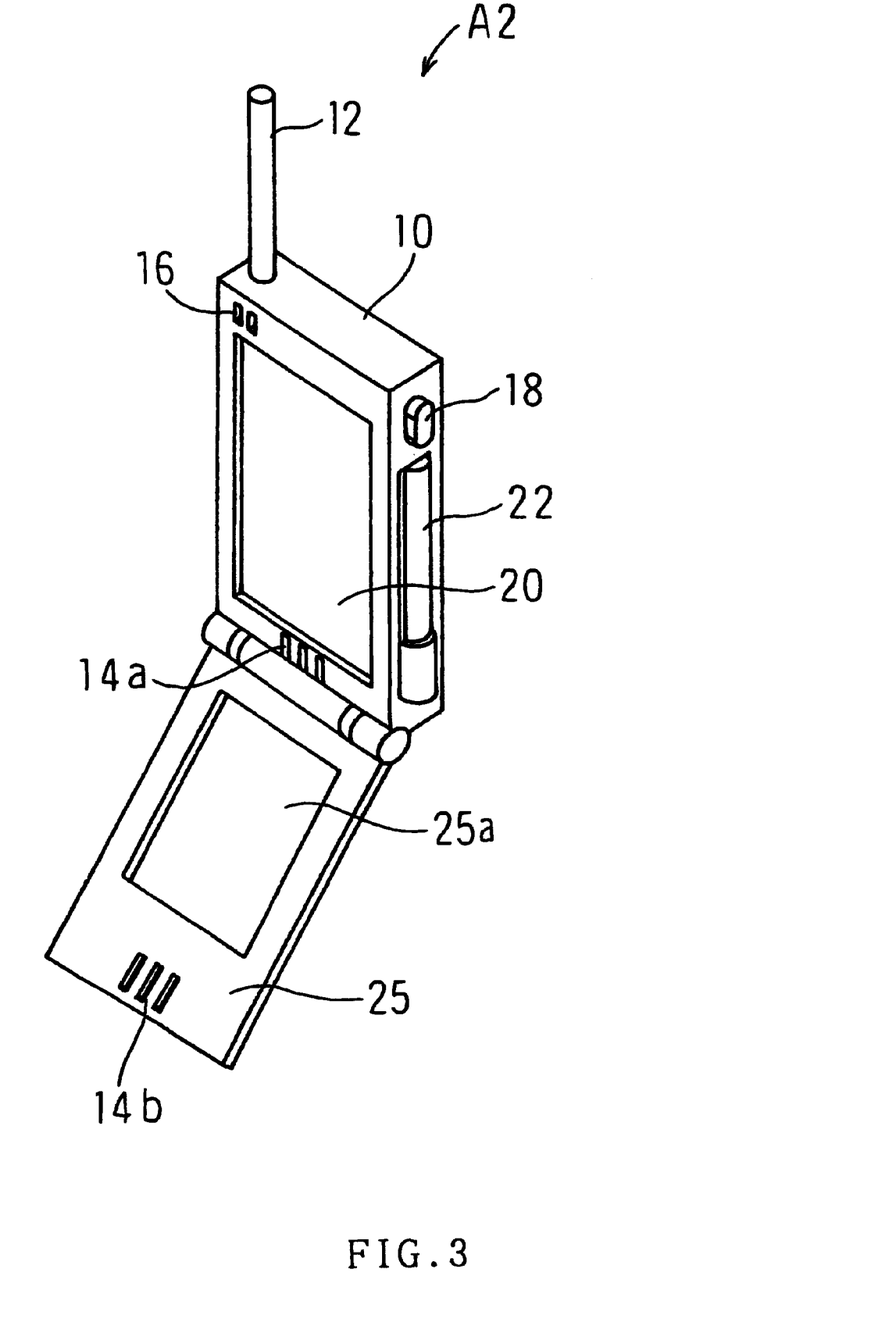
FIG. 3 is a perspective view of a portable terminal according to a second embodiment of the present invention when an enclosure of the portable terminal is open.
Figure 4:
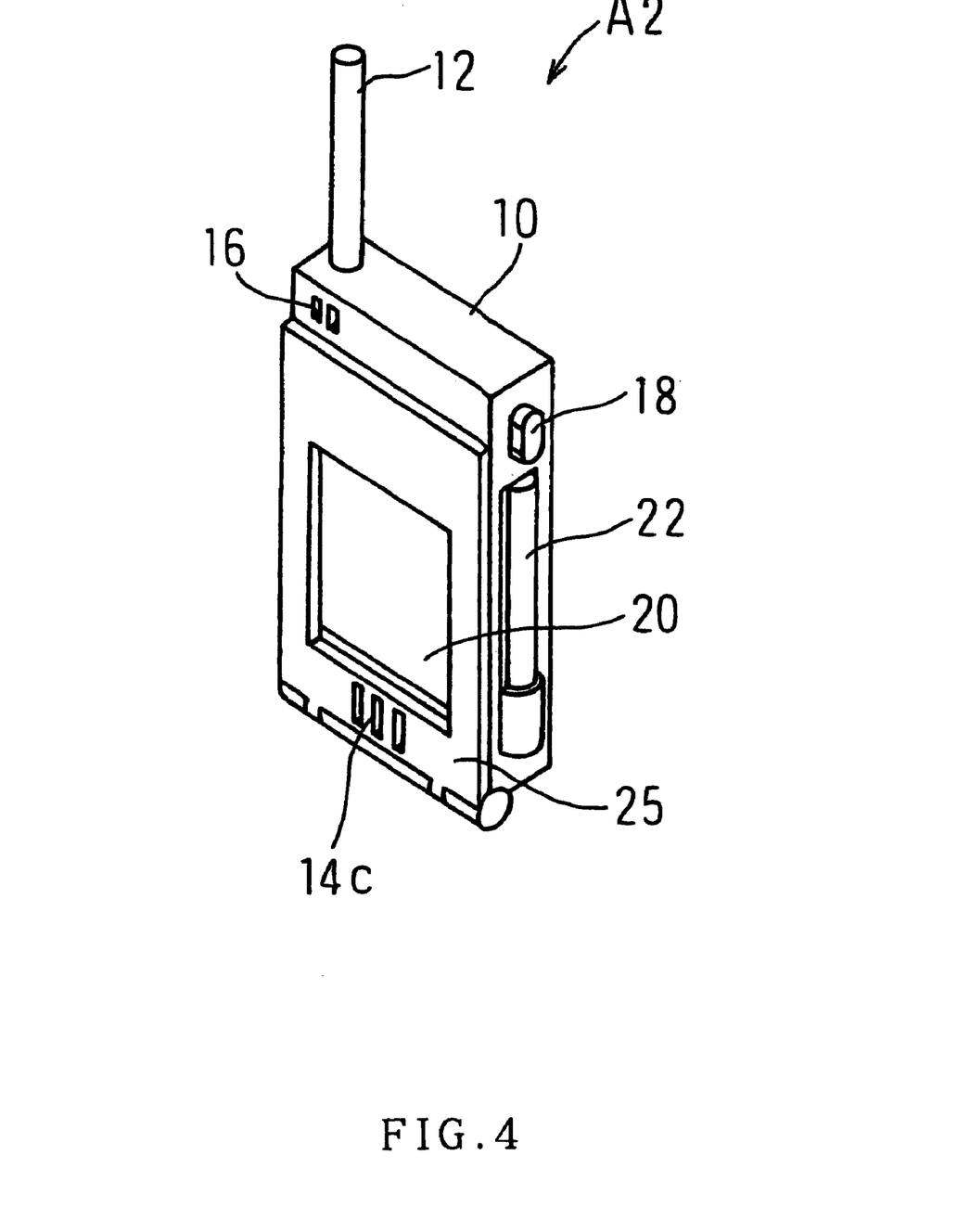
FIG. 4 is a perspective view of the portable terminal according to the second embodiment of the present invention when the enclosure is closed.

A portable terminal according to a second embodiment of the present invention will now be described. A portable terminal A2 of the second embodiment is constructed in such a manner as shown in FIGS. 3 and 4. In other words, the portable terminal A2 has substantially the same configuration as that of the portable terminal A1 of the first embodiment. More specifically, the portable terminal main body 10 comprises the antenna 12, the transmitter 14, the receiver 16, the power actuation switch 18, the display panel 20, and the pen holder 23. They are the same as those of the first embodiment in construction, and hence their explanations will be omitted here. An enclosure 25 is hinged to the portable terminal main body 10 via a hinge 26 so as to be movable through a predetermined angle. Differing from the enclosure 24 of the first embodiment, this enclosure 25 has a substantially rectangular window 25a. As in the first embodiment, the telephone transmitters 14b and 14c are formed in the enclosure 25.

Figure 5:
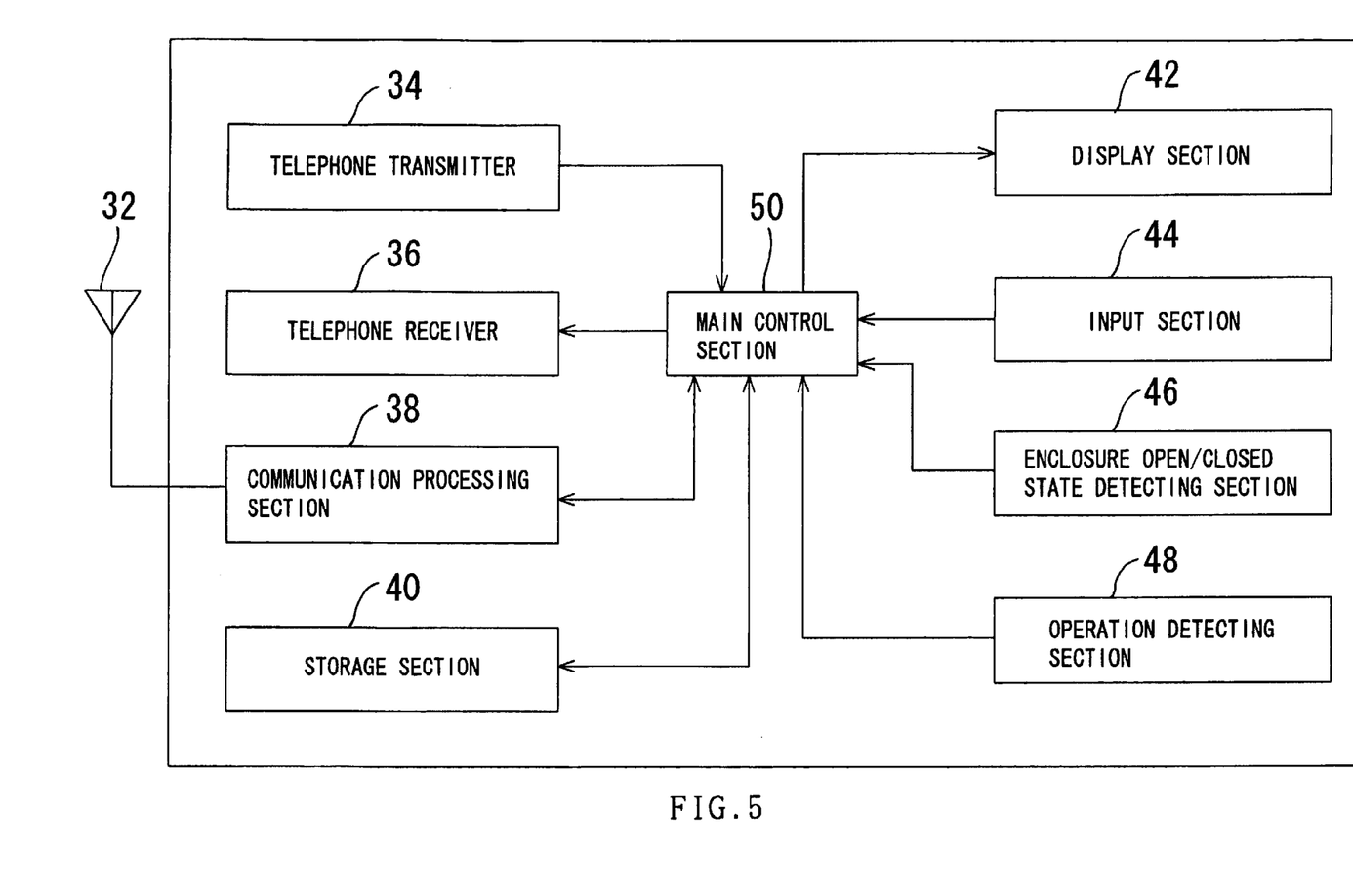
FIG. 5 is a block diagram showing the configuration of the portable terminal of the present invention.

A block diagram of the portable terminal A2 according to the second embodiment is the same as the block diagram shown in FIG. 5 in terms of configuration. Specifically, the portable terminal A2 comprises the antenna 32, the telephone transmitter 34, the telephone receiver 36, the communication processing section 38, the storage section 40, the display section 42, the input section 44, the enclosure open/closed state detecting section 46, the operation detection section 48, and the control section 50.

As in the first embodiment, the storage section 40 holds display image data for the normal-mode images and the memo-mode display images.

As in the first embodiment, the main control section 50 controls the operation of each of the above described sections. If the operation mode is set to the normal mode, the main control section 50 carries out a control operation so as to enable execution of normal telephone function. Further, as previously described, the window 25a is formed in the enclosure 25, and therefore it is possible to carry out a predetermined function in a telephone mode according to the control of the main control section 50 even when the enclosure 25 is closed. In short, even if the enclosure 25 is closed, the dial keys are displayed within the window 25a. As a result, it is possible to input dial keys even when the enclosure is closed. Further, the main control section 50 carries out a control operation so as to switch the operation mode between the normal mode and the memo mode in accordance with a result of the detection of the communication processing section 38. The detailed operation of the main control section 50 will be described hereinbelow.

Figure 7:
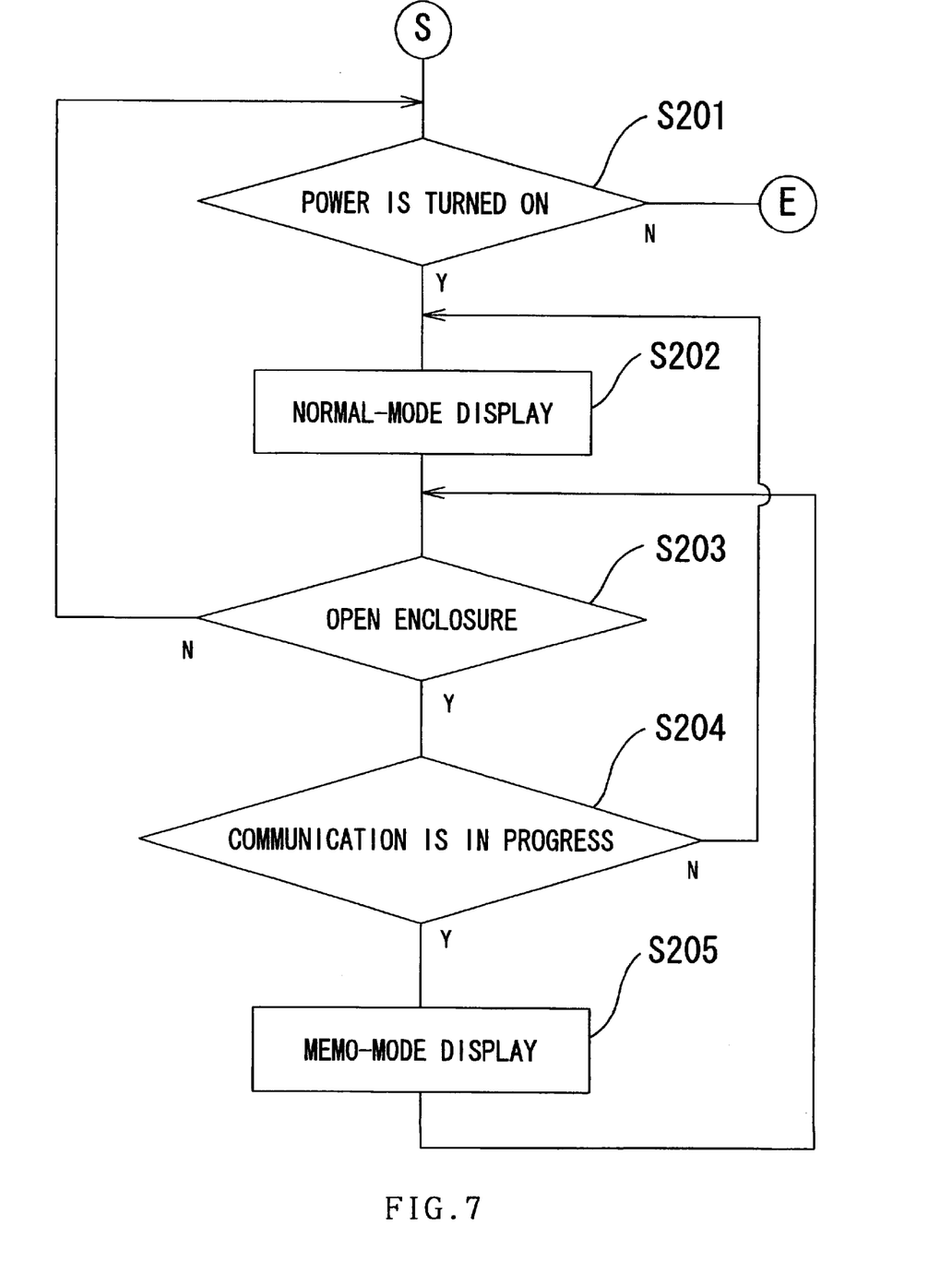
FIG. 7 is a block diagram showing the operation of the portable terminal of the second embodiment.

The operation of the portable terminal A2 having the above-described configuration will be described with reference to FIG. 7.

To begin with, the operation detecting section 46 detects whether or not the power switch 18 is turned on, and a result of the detection is sent to the main control section 50 (step S201). If the power switch is in an ON state, the processing proceeds to step S202. On the other hand, if the power switch is in an OFF state, the processing is immediately terminated. The detection carried out in step S201 is executed at predetermined periods.

If the power switch is in an ON state, the processing proceeds to step S202. The control section 50 instructs the display section 42 to indicate the normal-mode image. In short, the operation mode is set to the normal mode. As a result of the operation mode being switched to the normal mode, it becomes possible to carry out telephone functions such as the origination and receipt of calls. In other words, as in the first embodiment, if a predetermined coordinate on the touch panel is pressed, the input section 44 detects this pressing action. The position of the pressed point is notified to the main control section 50. The main control section 50 executes processing associated with the position of the pressed point and instructs the display section 42 to indicate a predetermined display. For example, if dial key displays are pressed, an input dial number is displayed in the dial number display position within the display image. Subsequently, if the transmission key is pressed, a call is originated by way of the communication processing section 38. On the other hand, if a call is received, it also becomes possible to start communication by pressing a predetermined hookup key.

As described above, the portable terminal A2 of the second embodiment enables input of a dial number while the enclosure 25 is closed. The portion of the display panel 20 covered with the enclosure 25 can be protected from external influences. Although the open area within the window 25a of the enclosure 25 is used only for dial keys, the open area may be sized so as to enable observation of an input dial number while the enclosure 25 is closed.

If the normal-mode image appears on the display section 42, the enclosure open/closed state detecting section 46 detects in step S203 whether the enclosure 25 is open or closed. A result of that detection is sent to the main control section 50. If the result of the detection is that the enclosure 25 is open, the processing proceeds to step S204. On the other hand, if the enclosure 25 is closed, a return to S201 takes place. Then, the state of the power switch 18 is detected.

If the enclosure 25 is open, the communication processing section 38 detects whether or not the portable terminal is in a communicating state in step S204. A result of the detection is sent to the main control section 50. The result of the detection is that the portable terminal is in a communicating state, the processing proceeds to step S205. On the other hand, if the portable terminal is not in the communicating state, a return to step S202 takes place again.

If the portable terminal is in a communicating state, the main control section 50 switches the operation mode to the memo mode in step S205. The memo-mode display image appears on the display section 21, which makes it possible to take memos. In short, as in the first embodiment, if a predetermined coordinate on the touch panel that acts as the input section 44 is pressed, the input section 44 the thus detected position of the pressed point. The thus detected position of the pressed point is notified to the main control section 50. The main control section 50 executes processing associated with the position of the pressed point and instructs the display section 42 to indicate a predetermined display. For example, in the case where a line or a letter is input in the touch panel by the pen 22, the main control section 50 indicates a display on the display section 42 in accordance with the information of the pressed position. Further, it is also possible for the main control section 50 to recognize predetermined hand-written letters and to convert them into corresponding typescripts, whereby the thus converted typescripts can be displayed. The contents of the memo can be stored in the storage section 40 by predetermined operations. If the portable terminal A2 has the facsimile function, it is possible to send the contents of the memo by facsimile. If the operation mode is switched to the memo mode in step S205, a return to step S203 takes place.

As described above, in the case where the enclosure 25 is open, and where the portable terminal is in a communicating state, the operation mode is switched to the memo mode. As a result, it becomes possible to take memos during telephone conversation. In other words, in order to carry out transmission, the enclosure is opened, and a call is originated. When the portable terminal comes in communication with a called party, the operation mode is switched to the memo mode. As a result, it becomes possible to take memos. If a call is originated while the enclosure is closed, the operation mode is switched to the memo mode by opening the enclosure 25 when the portable terminal becomes in communication with the called party. In consequence, it is possible to take memos. On the other hand, when the portable terminal receives a call, a ringing tone sounds. The moment a hookup operation is carried out, the portable terminal changes to a communicating state. However, even if the enclosure 25 remains closed, it is still possible to start communication. Therefore, the operation mode is not switched to the memo mode as a result of execution of a simple hookup operation. Switching of the operation mode to the memo mode does not take place when only the hookup operation is carried out but when the enclosure 25 is also opened. If the hookup operation is carried out after the enclosure 25 has been opened, the operation mode is switched to the memo mode the moment when the portable terminal changes to the communicating state. Further, the operation mode is automatically switched to the memo mode, and there is no need to switch the operation mode to the memo mode each time.

As in the first embodiment, it is impossible to make memos on the display panel 20 while the telephone receiver 16 is brought in contact with the ear. Therefore, an earphone (not shown) may be used, or the telephone receiver 16 may be provided with a so-called speaker function which makes it possible to listen to the voice of the called party without bringing the ear in contact with the telephone receiver 16 by amplifying the voice.

The above descriptions are based on the assumption that the operation mode is switched to the memo mode if the enclosure is open and if the portable terminal is in the communicating state. However, step S204 for determining whether or not the portable terminal is in the communicating state may be omitted, and the operation mode may be set so as to be switched to the memo mode when the enclosure 25 becomes open. In other words, since it is possible to carry out normal telephone functions while the enclosure is closed by means of the window 25a formed in the enclosure 25, it is also possible to switch the operation mode to the memo mode when the enclosure becomes open.

In the above descriptions, it has been explained that a return to step S202 takes place while the normal-mode image is displayed if the portable terminal is not in the communicating state in step S204. However, the normal-mode image (which will be taken as a first normal mode image) to be displayed while the enclosure is closed may be different from the normal-mode image (which will be taken as a second normal mode image) to be displayed while the enclosure is open. Further, a dial key display area in the above described first normal mode image may be set so as to become smaller than a dial key display area in the second normal mode image. As a result, the extent to which the display panel 20 is covered with the enclosure 25 while the enclosure 25 is closed becomes wide, and hence the extent to which the display panel 20 is protected can be increased.

Further, if key operations become necessary after the transmission operation has been carried out, the portable terminal A2 of the present embodiment is capable of displaying a normal-mode image by closing the enclosure 25. On the other hand, as in the first embodiment, it is also possible to arrange the portable terminal such that the memo mode switched in step S205 is forcibly returned to the normal mode by the input section 44.

As in the first embodiment, the operation mode may be switched to the memo mode only when the portable terminal A2 is a receiving end. In short, whether or not the portable terminal is a receiving end is determined between steps S204 and S205, and the operation mode is switched to the memo mode only when the portable terminal is a receiving end. If the portable terminal is not a receiving end, the processing proceeds to step S202, and a normal-mode image is displayed. In this event, the communication processing section 38 determines whether or not the portable terminal is a receiving end. In other words, the communication processing section 38 acts as the receiving-end detecting means.

Although the telephone transmitter 14c is formed in the exterior surface of the enclosures 24 and 25 in the above-described embodiments, the telephone transmitter 14a may be used through apertures formed in the enclosures 24 and 25.

In the above descriptions of the embodiments, it has been described that the icons are displayed as the memo-mode display images. It is also possible to arrange the display images such that a function is selected by command input.

Although the pressure-sensitive touch panel is used in the previous embodiments, another type of digitizer may be used. For example, an electrostatic inductive digitizer or an electromagnetic inductive digitizer may be used.

Several embodiments of the invention have now been described in detail. It is to be noted, however, that these descriptions of specific embodiments are merely illustrative of the principle underlying the inventive concept. It is contemplated that various modifications of the disclosed embodiments, as well as other embodiments of the invention will, without departing from the spirit and scope of the invention, be apparent to persons skilled in the art.

What is claim is:

1. A portable terminal having a radio communication function, comprising:
    a display panel having an image display section and a digitizer disposed on the image display section;
    a portable terminal main body equipped with the display panel;
    an enclosure attached to the portable terminal main body so as to be able to open and close;
    enclosure open/closed state detecting means for detecting an open state of the enclosure; and
    communicating state detecting means for detecting a communicating state of the portable terminal, wherein if the enclosure open/closed state detecting means detects the open state of the enclosure, and if the communication state detecting means detects a communicating state of the portable terminal, a memo mode is selected which makes it possible to take memos by input from the display.

2. The portable terminal according to claim 1, further comprising switching means for cancelling the memo mode by means of a user's operation when an operation mode of the portable terminal is the memo mode.

3. The portable terminal according to claim 1, wherein a display on the display panel is terminated when the enclosure is in a closed state.

4. The portable terminal according to claim 2, wherein a display on the display panel is terminated when the enclosure is in a closed state.

5. A portable terminal having a radio communication function, comprising:
    a display panel having an image display section and a digitizer disposed on the image display section;
    a portable terminal main body equipped with the display panel;
    an enclosure attached to the portable terminal main body so as to be able to open and close;
    enclosure open/closed state detecting means for detecting an open state of the enclosure;
    communicating state detecting means for detecting a communicating state of the portable terminal; and
    receiving-end detection means for detecting that the portable terminal is a receiver when in a communicating state, wherein if the enclosure open/closed state detecting means detects the open state of the enclosure, if the communicating state detecting means detects the communicating state of the portable terminal, and if the receiving-end detecting means detects that the portable terminal is a receiver, a memo mode is selected which makes it possible to take memos by input from the display.

6. The portable terminal according to claim 5, further comprising switching means for cancelling the memo mode by means of a user's operation when an operation mode of the portable terminal is the memo mode.

7. The portable terminal according to claim 5, wherein a display on the display panel is terminated when the enclosure is closed.

8. The portable terminal according to claim 6, wherein a display on the display panel is terminated when the enclosure is closed.

9. A portable terminal having a radio communication function, comprising:
    a display panel having an image display section and a digitizer disposed on the image display section;
    a portable terminal main body equipped with the display panel; and
    an enclosure which has a window and is attached to the portable terminal main body so as to be able to open and close, wherein when the power of the portable terminal is turned on, it is possible to carry out origination and receipt of calls even when the enclosure is closed by indicating on the display panel an image for a normal mode, in which at least the origination and receipt of telephone calls can be conducted, and by indicating display keys for at least carrying out the origination and receipt of calls within the window of the enclosure.

10. The portable terminal according to claim 9, wherein the operation mode is switched to the normal mode when the enclosure changes from an open state to a closed state, so that a normal-mode image is displayed.

11. The portable terminal according to claim 9, further comprising switching means for cancelling the memo mode by means of a user's operation when the operation mode is the memo mode.

12. The portable terminal according to claim 9, further comprising enclosure open/closed state detecting means for detecting an open state of the enclosure, and wherein when the enclosure open/closed state detecting means detects the open state of the enclosure, a memo mode is selected which makes it possible to take memos by input from the display.

13. The portable terminal according to claim 12, wherein the operation mode is switched to the normal mode when the enclosure changes from an open state to a closed state, so that a normal-mode image is displayed.

14. The portable terminal according to claim 12, further comprising switching means for cancelling the memo mode by means of a user's operation when the operation mode is the memo mode.

15. The portable terminal according to claim 9, further comprising enclosure open/closed state detecting means for detecting an open state of the enclosure, and communicating state detecting means for detecting a communicating state of the portable terminal, and wherein if the enclosure open/closed state detecting means detects the open state of the enclosure, and if the communicating state detecting means detects the communicating state of the portable terminal, a memo mode is selected which makes it possible to take memos by input from the display.

16. The portable terminal according to claim 15, wherein the operation mode is switched to the normal mode when the enclosure changes from an open state to a closed state, so that a normal-mode image is displayed.

17. The portable terminal according to claim 15, further comprising switching means for cancelling the memo mode by means of a user's operation when the operation mode is the memo mode.

18. The portable terminal according to claim 15, wherein an area in which normal-mode display keys are displayed when the enclosure is closed is set so as to become smaller than an area in which the normal-mode display keys are displayed when the enclosure is open.

19. The portable terminal according to claim 9, further comprising enclosure open/closed state detecting means for detecting an open state of the enclosure, communicating state detecting means for detecting a communicating state of the portable terminal, and receiving-end detection means for detecting that the portable terminal is a receiver when in a communicating state, and wherein if the enclosure open/closed state detecting means detects the open state of the enclosure, if the communicating state detecting means detects a communicating state of the portable terminal, and if the receiving-end detecting means detects that the potable terminal is a receiver, a memo mode is selected which makes it possible to take memos by input from the display.

20. The portable terminal according to claim 19, wherein the operation mode is switched to the normal mode when the enclosure changes from an open state to a closed state, so that a normal-mode image is displayed.

21. The portable terminal according to claim 19, further comprising switching means for cancelling the memo mode by means of a user's operation when the operation mode is the memo mode.

22. The portable terminal according to claim 19, wherein an area in which normal-mode display keys are displayed when the enclosure is closed is set so as to become smaller than an area in which the normal-mode display keys are displayed when the enclosure is open.

* * * * *